United States Patent

Russell-Smith et al.

Patent Number: 5,249,092
Date of Patent: Sep. 28, 1993

[54] HEAD LEAD TERMINATION

[75] Inventors: John H. Russell-Smith, Horndean; Ian S. Warn, Locks Heath, both of England

[73] Assignee: International Business Machines Corporation, Armonk, N.Y.

[21] Appl. No.: 691,000
[22] PCT Filed: Oct. 27, 1989
[86] PCT No.: PCT/GB89/01289
§ 371 Date: Aug. 26, 1991
§ 102(e) Date: Aug. 26, 1991
[87] PCT Pub. No.: WO91/06946
PCT Pub. Date: May 16, 1991

[51] Int. Cl.$^5$ ............................................... G11B 5/48
[52] U.S. Cl. ....................................................... 360/104
[58] Field of Search ............................... 360/104–106, 360/108

[56] References Cited

U.S. PATENT DOCUMENTS 5,012,368 4/1991 Bosier .................................. 360/104

OTHER PUBLICATIONS

IBM Technical Disclosure Bulletin, vol. 15, No. 1, Jun. 1972–"Directly Attached Integrated Circuit Lead Frame".
IBM Technical Disclosure Bulletin, vol. 19, No. 5, Oct. 1976–"Transducer Assembly to Circuit–Board Interconnect".
IBM Technical Disclosure Bulletin, vol. 20, No. 12, May 1978–"Tape Cable Clip".
IBM Technical Disclosure Bulletin, vol. 24, No. 9, Feb. 1982–"Circuit Packaging Scheme for Adaptation of a Flexible Circuit Carrier to a Rigid Carrier".
IBM Technical Disclosure Bulletin, vol. 26, No. 11, Apr. 1984–"Magnetic Wire Preparation for Automatic Wire Bond".
IBM Hursley, England published brochure in Aug. 1989 entitled "1988 Business Year Highlights".

Primary Examiner—A. J. Heinz
Attorney, Agent, or Firm—Richard E. Billion; Roy W. Truelson

[57] ABSTRACT

A magnetic head/support assembly for incorporation in the data access mechanism of a disk file includes a magnetic head and assembly and a separate member for locating the head leads remotely from the head element. The head lead locating member preferably comprises a pair of adhesively bonded thin laminate strips, between which the leads are situated. The strips maintain the leads in a fixed spaced apart relationship for a sufficient portion of their lengths to permit direct electrical connection to a correspondingly spaced pattern of conductors on external data channel circuitry carried by the data access mechanism.

24 Claims, 7 Drawing Sheets

HEAD LEAD TERMINATION

TECHNICAL FIELD OF THE INVENTION

The present invention relates to the termination of head leads in a magnetic head/support assembly for use in a disk file, and also to a data access mechanism incorporating such an assembly and to a method of manufacturing such an assembly.

BACKGROUND ART

Magnetic heads for disk files may now be supplied in the form of a complete magnetic head arm assembly in which a pair of sliders carrying the transducing elements are mounted on suspension flexures, which in turn are attached to a common support arm. The head arm assembly is adapted for mounting on the head positioning actuator.

With this type of magnetic head arm assembly it is necessary to connect the fine wires, carrying the head signals, to printed circuitry carried by the moving portion of the head positioning actuator.

Connection of the leads from a large number of heads to such printed circuitry is very labour intensive as each individual head lead must be placed over and soldered to a corresponding conductor or terminal pad. Also, because of its intricacy, this process can give rise to a low yield.

An article by J. P. G. Duman et al. (IBM Technical Disclosure Bulletin Vol 20 No. 5 Oct. 1977, p1984) entitled "Actuator Assembly for a Disk File", shows such connections for a rotary actuator having a rigid arm with compliant head suspensions mounted on the arm in which the signal processing electronics are mounted on a rigid printed circuit board (PCB) mounted statically alongside the actuator. Connection to the PCB is via a flexible tape cable having one end connected both electrically and mechanically to the PCB end and the other mounted on the arm, with a free portion of flexible cable in between to facilitate actuator movement. Connection of the head leads to the flexible cable at the arm end is achieved by soldering of the free ends of the leads to exposed contact pads on the end of the flexible cable mounted on the arm.

A further example of head lead connection to a circuit is given in an article by J. T. Young (IBM Technical Disclosure Bulletin Vol 20 No 12 May 1978 p5350), entitled "Tape Cable Clip". This shows another arrangement with head leads connected to conductors in a tape cable. It includes a clip, whose primary function is to retain the tape cable to the arm. As a secondary function, the clip also retains the free ends of the head leads against the arm and provides strain relief for them. It achieves this secondary function through a sprung member with channels which cover and clamp the head leads to the arm at a point some distance from the point of connection to the tape cable. No details are given of the method of attaching the head leads to the cable but, in the IBM 3310 Disk Storage Facility, which employs the described arrangement, the free ends of the head leads are manually bent and positioned to lie over contact pads on the tape cable, whereupon solder is applied to bond the lead ends to the tape cable. Thus the clip provides limited retention of the leads to assist manual soldering but does not avoid the manipulation of individual leads.

In an article entitled "Magnetic Wire Preparation for Automatic Wire Bond" by A. Ilgovsky and A. A. Mirza (IBM Technical Disclosure Bulletin Vol 26 No 11 Apr. 1984, p5989), a head arm assembly is shown in which the ends of the head leads are not left free but are soldered to a small terminal board. Although this board facilitates connection of the head arm assembly to the external circuitry in that it is sturdier and more stable than the free head leads, it does introduce an additional connector and multiplies the number of electrical termination operations needed, with a consequently greater chance of failure of the component.

It is well known to connect integrated circuit chips to external circuitry by means of so called "lead frames". These are patterns of metal fingers which locate on respective pins of the chip. A lead frame which is itself encapsulated in a plastic material support shell is shown in an article by W. R. DeBoskey entitled "Directly attached integrated circuit lead frame" (IBM Technical Disclosure Bulletin Vol 15 No 1 Jun. 1972, p307).

An article by K. R. Dust (IBM Technical Disclosure Bulletin Vol 24 No 9 Feb. 1982 p4473) describes methods for connecting a pattern of conductors on a flexible circuit carrier to a similar pattern of conductors on a rigid carrier. The article mentions as background the possibility of stripping away a region of the flexible material to leave a window across which only the conductors extend. These conductors would then be soldered onto the rigid carrier. This method of stripping away flexible material is ruled out because it would be prohibitively expensive, and the article goes on to describe mechanical means for connecting the two patterns of conductors. Neither technique is applied to magnetic head lead termination. In the case of head leads, neither method would provide a solution to the problem of terminating the individual head leads.

Pending European Patent Application No. 88303926.5 proposes one solution to the problem of head lead termination, namely that all of the leads from an individual magnetic head arm assembly (typically six leads) should be terminated on a head lead locating frame, across which the leads are guided and maintained in a fixed spaced apart relationship. The head leads are thus prepositioned by the frame for registration with and electrical connection to a correspondingly spaced conductor pattern on a printed circuit connector mounted on the actuator mechanism. Once a particular frame has been aligned with the appropriate conductor pattern, all of the head leads within that frame can be soldered as a group by, for example, wave or probe soldering, without the need to manipulate individual leads. However, in a disk file with a large number of heads, several of such frames must be used, each one requiring an alignment and soldering operation.

Therefore apart from this copending application, which is not publicly available, the prior art does not provide a magnetic head/support assembly in which the head leads can readily be directly connected to external circuitry in an automated or semi-automated fashion.

DISCLOSURE OF THE INVENTION

According to the invention there is now provided a magnetic head/support assembly, which assembly includes at least one magnetic head element for reading information from and/or writing information on a magnetic record disk of a magnetic disk file, a support structure mountable in such a disk file for supporting the magnetic head element in transducing relationship with said magnetic record disk, and a plurality of electrical conductor leads for carrying information signals to or from the head element, the assembly further including a head lead locating means for locating the head leads remotely from the head element and retaining them in fixed spaced apart relationship over a sufficient portion of their lengths to permit direct electrical connection of said portions to a correspondingly spaced pattern of conductors on external circuitry, characterised in that the locating means comprises a member, to which the leads are attached, the leads providing the only mechanical connection between said member and the support structure.

The lead locating member is preferably a lamina, but could be, for example, a rod, bar or tube, of solid or skeletal construction.

The leads may be attached to the locating member by means of an adhesive strip, drops of adhesive, or clamping means, but preferably the lead locating means includes a further lamina in addition to the first mentioned lamina, the leads being sandwiched between said laminae.

Although the lead locating means preferably includes a frame, defining a gap, across which the connection portions of the leads extend, the locating means could comprise a single strip, to which the leads are attached in spaced apart relationship. Portions of the leads, adjacent to the strip, would be substantially maintained by this arrangement in a suitable spaced apart relationship to allow said portions to be electrically connected to external circuitry.

It is preferred that said gap is defined by two or more spaced apart strips of material. This arrangement has the advantage that the leads may be supported at both ends of their connection portions. The strips may or may not be linked together.

In one preferred arrangement at least a portion of the flat surface of the first mentioned lamina has a coating of an adhesive material. This may be used merely to attach the leads, but in the case in which the locating means includes two laminae, the adhesive may be used to bond the laminae together. Clearly, in this latter case, it would be possible to apply an adhesive to the surface or to both mating surfaces immediately before bonding the two laminae, or at an earlier stage in the manufacture of the head/support assembly.

An alternative method of bonding the laminae would be to weld the laminae together.

It is preferable that the head lead locating means is substantially resistant to the heat associated with subsequent soldering of the head leads to external circuitry. This has the advantage that the lead alignment provided by the locating means is maintained during the soldering process. If the material used in the construction of the locating means buckled or melted substantially when exposed to such heating, the connection portions of the head leads could be moved onto adjacent solder pads. An example of a suitable heat-resistant material is a polyamide material.

The invention also provides a bank of magnetic head/support assemblies, characterised in that the head leads from said magnetic head/support assemblies are located by a common locating means. The use of such a common means has the advantage that the leads from a large number of magnetic heads, in a multi head machine, can be registered with and connected to external circuitry in a single operation. This can increase the speed of assembly and increase the reliability of a disk file, as well as reducing the assembly cost.

Clearly, it is not a requirement of the invention that all of the head leads in a particular disk file are located using one single lead locating means. It may be convenient instead to use two or more of such locating means.

The invention further provides a data access mechanism for a disk file including a magnetic head/support assembly or a bank of such assemblies, a movable carriage on which said assembly or bank of assemblies is mounted for movement relative to the disk, a circuit support member, also mounted on the carriage, which supports data channel components and a conductor pattern on which said components are mounted and to which they are connected, the head lead locating means being registered with a corresponding portion of the circuit support member and the connection portions of the head leads being electrically connected to corresponding portions of the conductor pattern.

The invention also provides a method for manufacturing a magnetic head/support assembly or a bank of such assemblies which includes the steps of placing said locating member on a suitable jig, supporting one or more support structures and associated head elements in juxtaposition with said locating member, laying the head leads from said head elements across said locating member in said desired spaced apart relationship, and securing the head leads to said locating member.

The invention also provides a method as described above for manufacturing a magnetic head/support assembly, or a bank of such assemblies, of the kind in which said locating member is a lamina and the head lead locating means includes a further lamina, the method further comprising the steps of placing said further lamina over said first mentioned lamina, to sandwich said leads therebetween, and bonding said two laminae, to retain the leads in place.

In the latter method, after the step of bonding the two laminae together, the laminae may be left intact, or alternatively portions may be cut from the laminae before the locating means is registered with the external circuitry. For example, an individual lamina may include portions designed to provide strength or to aid an alignment step during the assembly of the locating means, but which portions can be cut away after said assembly has been completed.

Preferably, in the latter method, the laminae are aligned on the jig by means of alignment holes in the laminae, which are mated with correspondingly disposed alignment pegs mounted on the jig. It is preferred that these pegs, and the corresponding holes, are disposed asymmetrically on the jig and lamina respectively. The advantage of this asymmetry is that a particular lamina may be placed on the jig in one orientation only. This feature can help an operator to avoid placing a lamina, coated on one surface with adhesive, upside down on the jig.

The alignment holes in the laminae may also be aligned with similarly disposed holes or pegs on the external circuitry, after the lead locating means has been assembled, in order to align the head leads with their respective solder pads on the circuitry.

Preferably, when the leads are being laid across the locating member, they are aligned into the desired spaced apart relationship by means of a guide on the jig. However, they could be aligned by means of a guide on the locating member. The jig guide could comprise a row of posts, around which the leads may be bent, or possibly means for fanning out a group of leads from a fixed point, but it is preferred that the jig guide includes slots, in which the head leads are located during the step of securing the leads to the locating member.

It is preferable that the step of placing the leads across the locating member, as described above, should include the step of temporarily restraining the free ends of the leads. The advantage of including this step is that by restraining their free ends the leads may be held sufficiently tautly to remove any slack. This allows the leads to be aligned across the lamina with a higher precision.

The free ends of the leads could be restrained by a clip or by using binding posts, but in the preferred embodiment of the invention the free ends are bonded temporarily to an adhesive layer on the jig, spaced from the guide.

INTRODUCTION TO THE DRAWINGS

In order that the invention may be fully understood, a preferred embodiment thereof will now be described, by way of example only, with reference to the accompanying drawings in which the same reference numerals denote the same elements throughout and in which.

DETAILED DESCRIPTION OF THE PREFERRED EMBODIMENT

Figure 1:
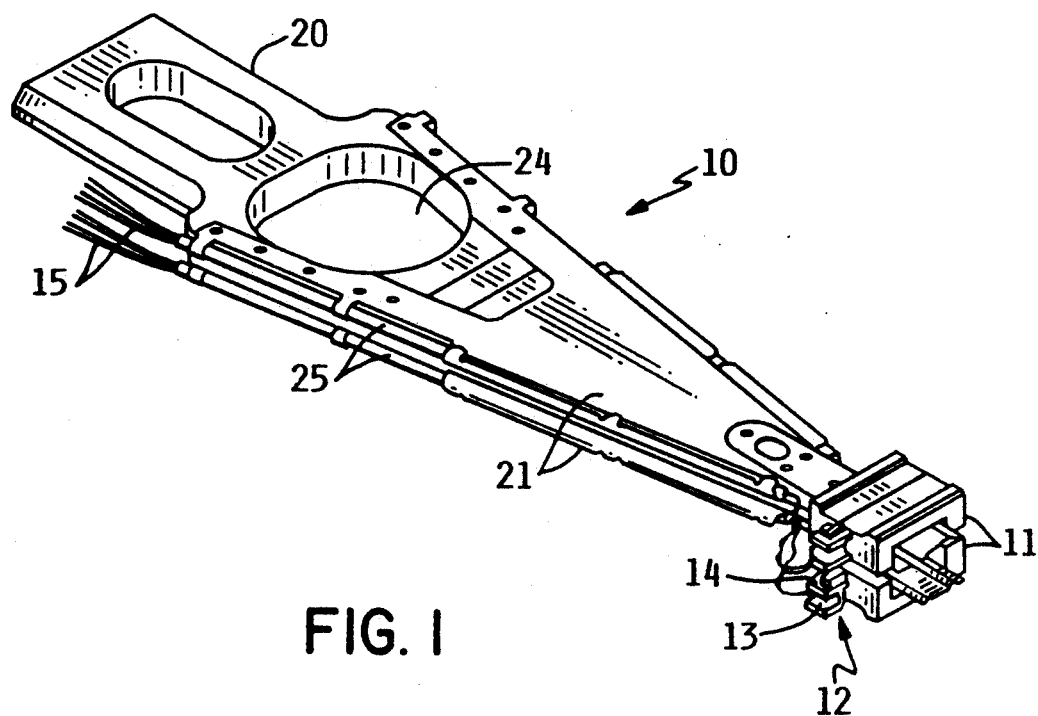
FIG. 1 is a perspective view of a magnetic head arm assembly.

Referring now to FIG. 1 which shows a magnetic head arm assembly 10, the assembly includes a rigid arm 20 which is adapted to plug into the movable carriage of a head positioning actuator of the voice coil motor type. The arm carries a pair of flexures 21 on each of which is mounted a slider 11. Each slider carries a magnetic transducing head 12, comprising a coil 13 wound round a magnetic core 14. The arm 20 incorporates a guide aperture 24 which is substantially circular in shape. Fine leads 15 from the coil carry electrical signals to and from the head element. The flexures 21 support the sliders 11 adjacent to the surface of the disk while providing the required resilience to permit the sliders to fly over the disk surface. The single rigid arm 20 carries two such flexures 21 and sliders 11, and the magnetic head arm assembly passes between two disks so that one head access the top surface of an underlying disk while the other head accesses the bottom surface of an overlying disk.

Figure 2:
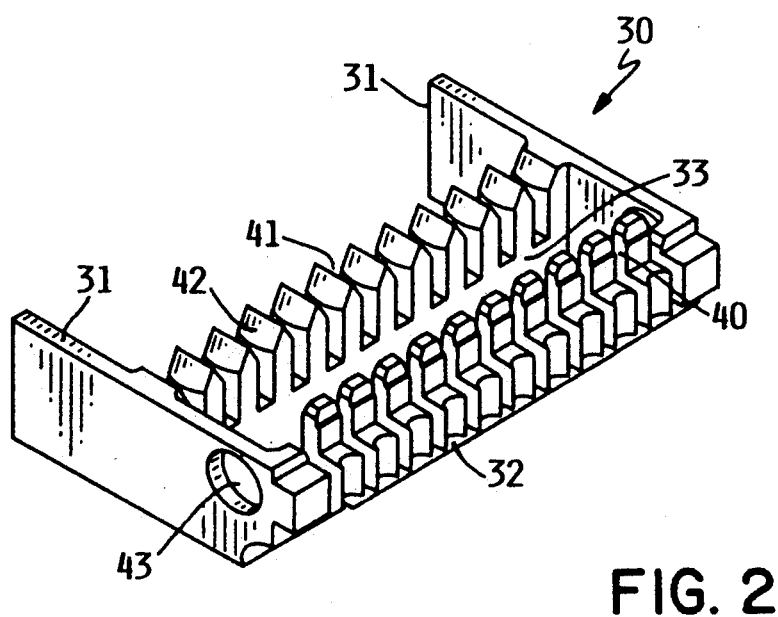
FIG. 2 is a perspective view of a head carrier for carrying such assemblies.

The electrical leads 15 from each head pass inside fine tubes 25 running along the length of the suspension. These leads are each approximately 0.05 mm in diameter and each head has two separate signal leads plus two earth leads, the earth leads being twisted together so that, effective, each head has three leads. FIG. 2 shows a head carrier 30 comprising two parallel side walls 31, joined at one end by a cross member 32. A second cross member 33 joins the side walls at a point further along their length.

A series of eleven location slots 40 is located along the length of the first cross member 32. The same number of collapsing grooves 41 is situated along the length of the second cross member 33. In the second cross member, each of the ten tongues 42 formed by the grooves 41 is bevelled at the top. A guide aperture 43, substantially circular in shape, is positioned near the end of each of the two side walls 31 nearest the first cross member 32.

Figure 3:
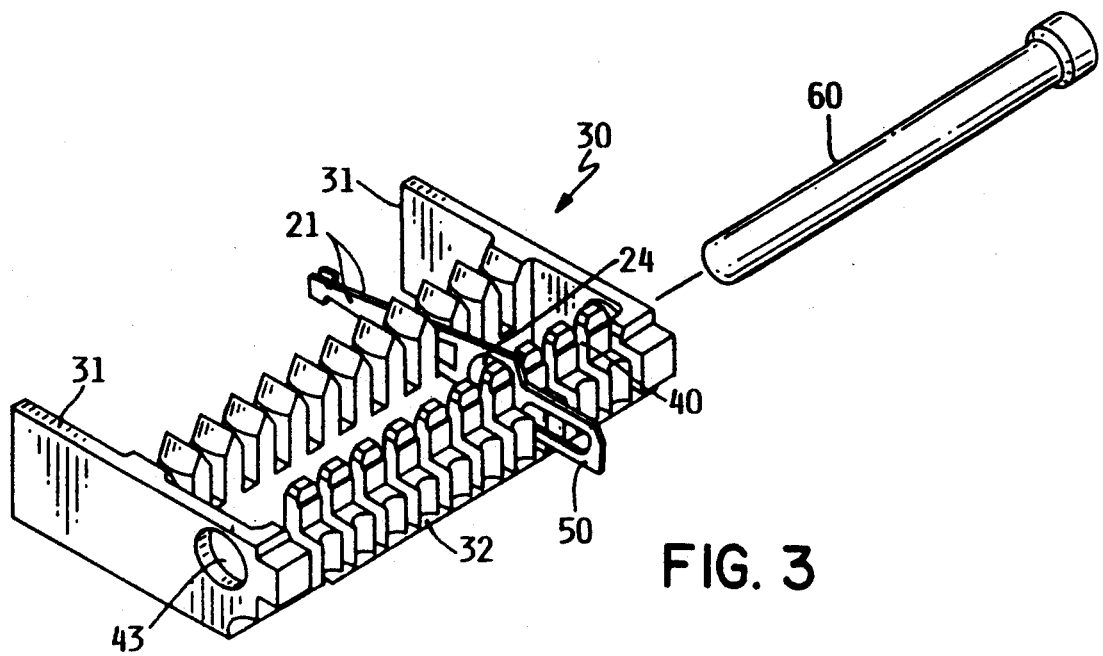
FIG. 3 is a perspective view of the head carrier of FIG. 2 with magnetic head arm assembly, as illustrated in FIG. 1, in place.

FIG. 3 shows the head carrier 30 with one magnetic head arm assembly 10 in position. The tail 50 of the rigid arm 20 locates in one slot 40 of the first cross member 32 so that a portion extends beyond the extent of the carrier, and the substantially circular hole 24 in the rigid arm is in line with the two guide apertures 43 in the side walls 1 of the carrier. The flexures 21 are located in, and collapsed by, the corresponding collapsing groove 41 in the second cross member 33. The magnetic head arm assembly is therefore held in the carrier, parallel to the side walls, by the slot and the corresponding groove. The remaining magnetic head arm assemblies are loaded into the carrier in the same way, forming a bank of assemblies in parallel spaced apart relationship.

Figure 4:
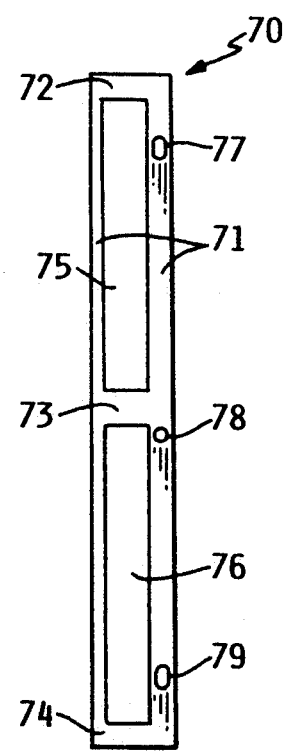
FIG. 4 is a plan view of a lead locating frame lamina, employed in the method according to the invention.

When all the assemblies are in the correct position, an alignment pin 60 is pushed through the guide apertures 43 in the side walls of the carrier and through the guide holes 24 in the rigid arm portions 20 of each assembly 10. This locks the assemblies in place. FIG. 4 shows a locating frame lamina 70. The lamina is cut or stamped from a thin sheet of a flexible and electrically insulating material such as a polyamide, and comprises two parallel strips 71 linked by three cross members 72, 73 and 74. By means of these strips and cross members, two rectangular apertures 75 and 76 are defined, across which apertures the head leads will be extended. Cross members 72 and 74 are included to strengthen the lamina during the assembly of the frame, and are removed when the assembly has been completed.

One surface of the lamina is coated with a thermosetting adhesive. Guide holes 77, 78 and 79 are included so that individual laminae may be aligned with one another before being bonded together.

The method of aligning the head leads and assembling a complete locating frame will now be described with reference to FIGS. 5-8.

Figure 5:
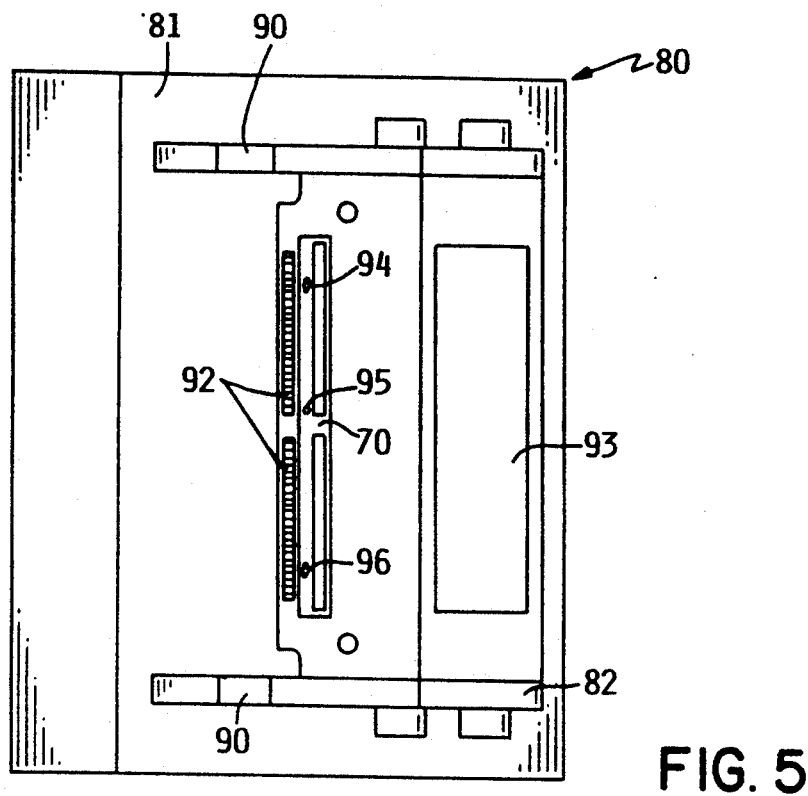
FIG. 5 is a plan view of a jig for assembling a lead locating frame, with one frame lamina already in position.

FIG. 5 is a plan view of a jig 80 on which the locating frame can be assembled. The jig comprises a base plate 81 and a chassis 82 mounted on the base plate. The chassis includes guide slots 90 adapted to receive the alignment pin 60 associated with the head carrier 30, frame lamina alignment pegs 94, 95 and 96, and head lead positioning slots 92. A strip of double-sided adhesive tape 93 is positioned to hold the free ends of the head leads temporarily. One frame lamina 70 is shown in place. This lower lamina is aligned, with its adhesive surface upwards, on the jig by means of the frame alignment pegs 94, 95 and 96 on the jig mating with the alignment holes 77, 78 and 79 on the lamina. The alignment peg 95, and the corresponding alignment hole 78, are positioned asymmetrically on the jig and the lamina respectively. Thus a particular lamina may be placed onto the jig in one orientation only. This feature can help the operator avoid placing, for example, the lower lamina on the jig with its adhesive surface downwards.

Figure 6:
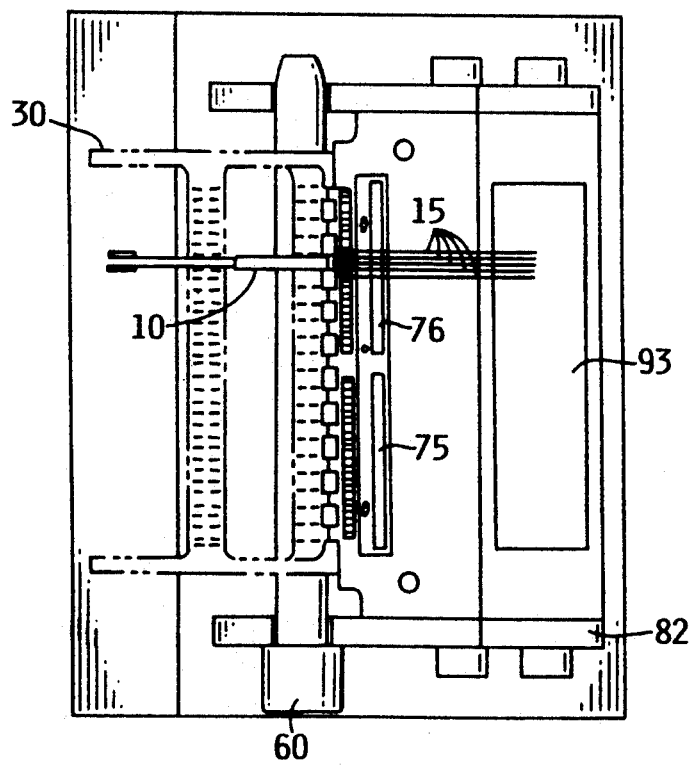
FIG. 6 is a plan view of the jig of FIG. 5, with a head carrier in place, and with the leads from one magnetic head arm assembly positioned across the frame lamina.

FIG. 6 shows the jig 80 with a head carrier 30 in position. In practice the head carrier would be loaded with its full complement of magnetic head arm assemblies 10; however, to simplify the drawing, only one such assembly is shown. The tail portions 50 of the magnetic head arm assemblies fit loosely into a recess (not shown) in the chassis 82. The guide pin 60 associated with the head carrier fits into slots 90 in the chassis.

Each individual head lead 15 from a magnetic head arm assembly mounted on the carrier is manually threaded through a corresponding positioning slot 92, and laid across the lower frame lamina, crossing one of the apertures 75 and 96, in a direction substantially parallel to that of the rigid arm 20 of the magnetic head arm assembly 10. The free end of the lead is secured by pressing it down onto the adhesive tape 93. During these operations the lead is held sufficiently taut to remove any slack, but without applying such a large force that the lead is in danger of breaking. The leads from each of the magnetic head arm assemblies in the carrier are laid across the lower frame lamina in this way. A system of colour coded leads is used to ensure that the operator lays the leads across the lower frame lamina in the correct order. Once all of the leads have been positioned, a second, upper, lamina is placed over the first.

Figure 7:
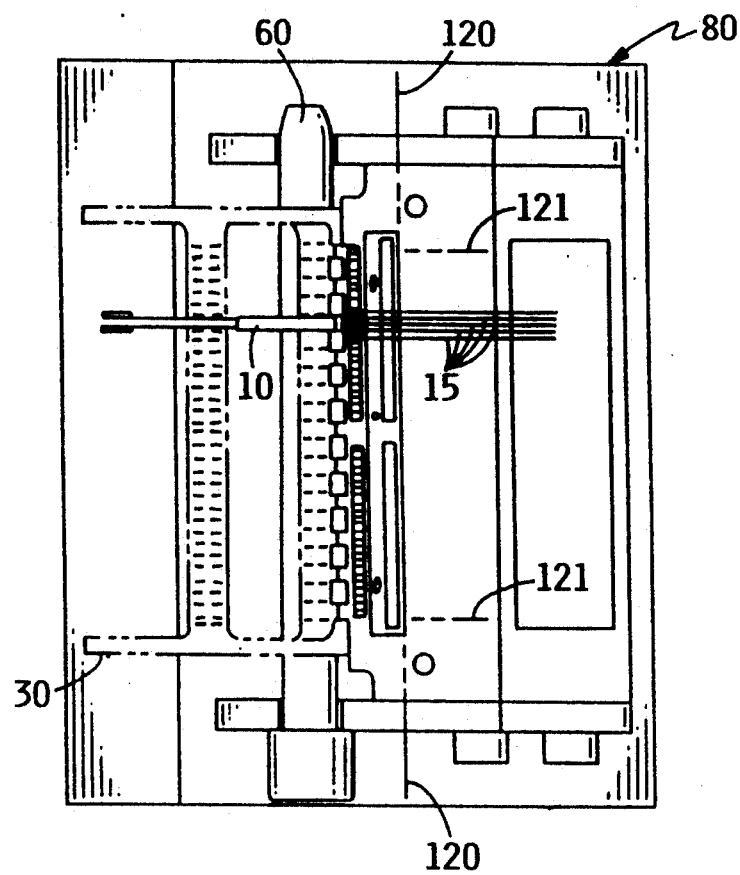
FIG. 7 is a plan view of the jig of FIG. 6, with a second frame lamina in position.
Figure 8:
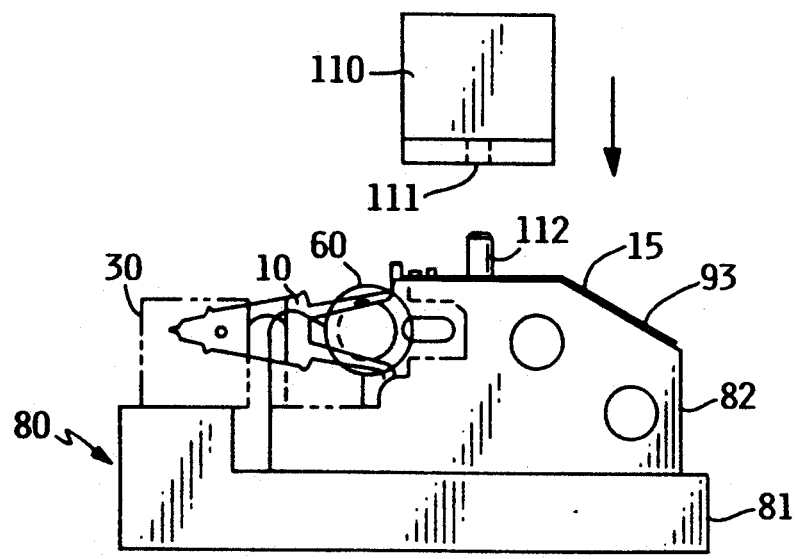
FIG. 8 is a side elevation of the jig of FIG. 7, with a bonding tool positioned above the frame laminae.

FIG. 7 shows the jig 80 with an upper frame lamina in place, adhesive surface downwards. The head leads 15 are sandwiched between the lower and upper laminae. Again, only one magnetic head arm assembly 10 has been shown, to simplify the drawing. A side elevation of the jig of FIG. 7 is shown in FIG. 8.

With the upper lamina in position, a bonding tool 110 is then pressed onto the laminae. This tool is aligned onto the jig by alignment sockets 111 on the tool mating with alignment posts 112 mounted on the jig. The tool applies pressure and heat to the frame sandwich, causing the adhesive between the lower and upper laminae to cure. In this way the two laminae are joined together, thus holding the head leads 15 in place.

The free ends of the head leads are severed along the line 120 (FIG. 7), and the frame is trimmed along the line 121 to remove cross members 72 and 74. This concludes the assembly of the frame, and the head carrier and lead frame may then be removed from the jig.

Figure 9:
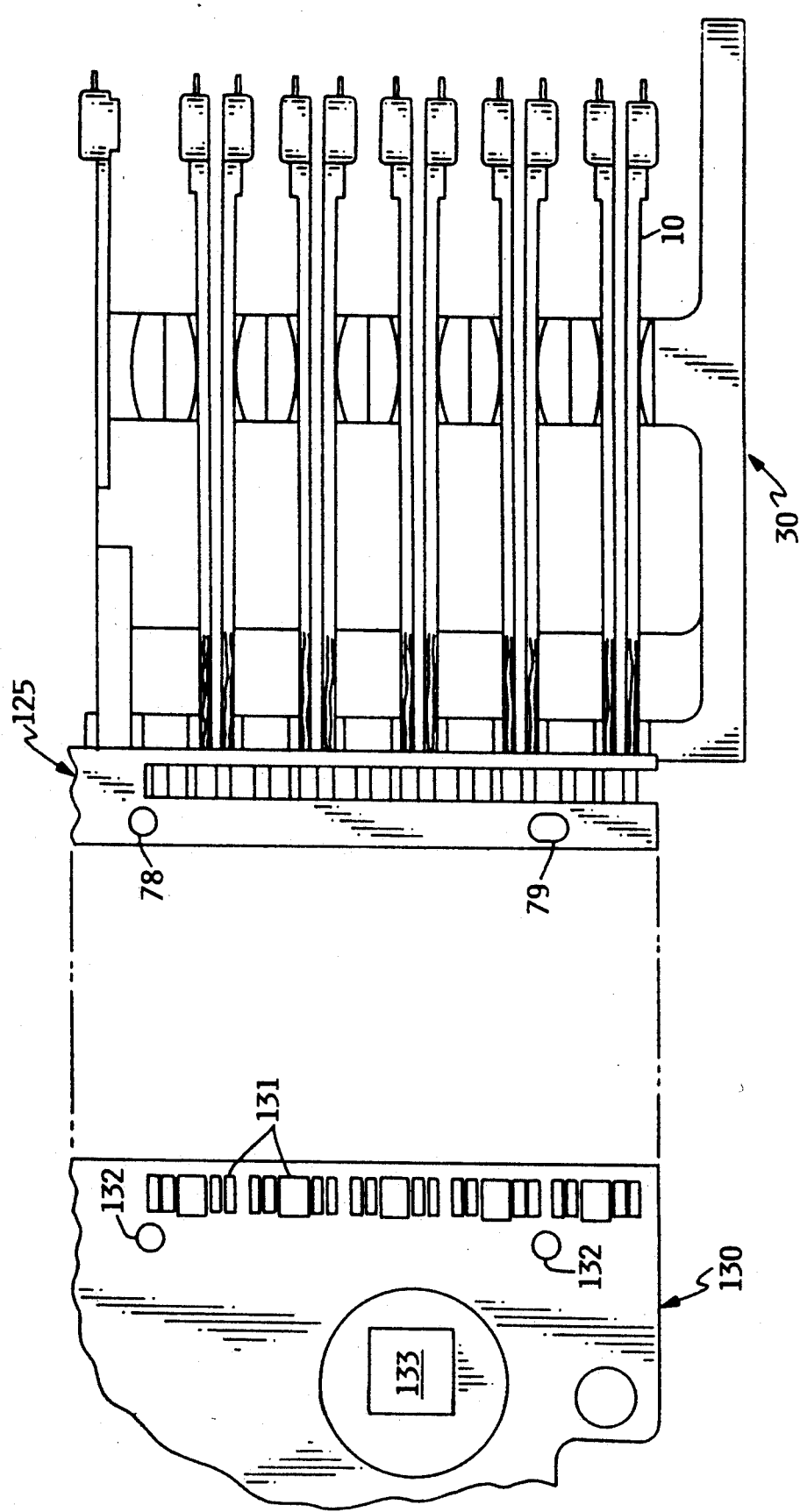
FIG. 9 shows a portion of the head carrier and associated lead locating frame, and a corresponding portion of printed circuitry adapted to receive the head leads.
Figure 10:
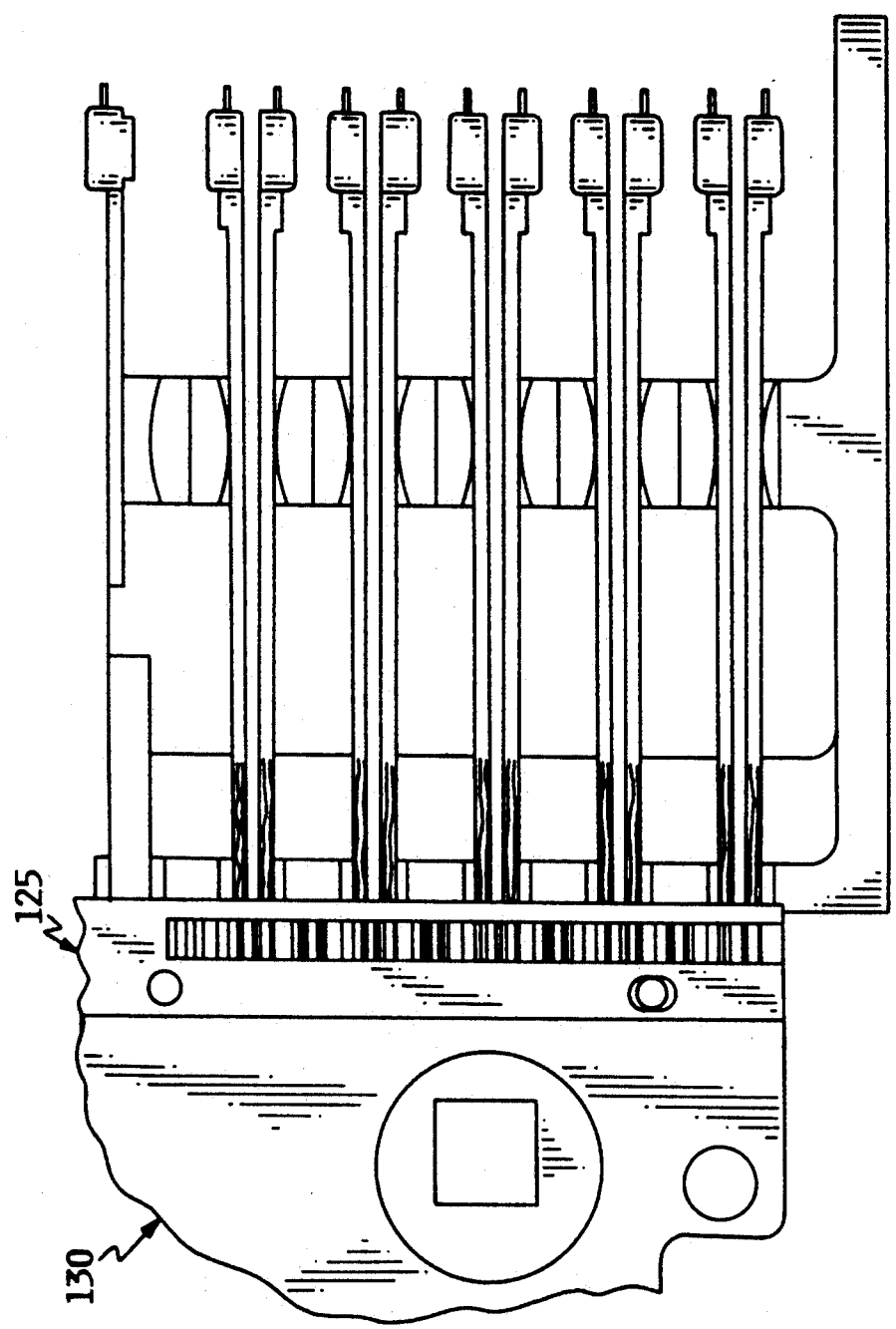
FIG. 10 shows a portion of the head carrier and associated lead locating frame, with the frame carrying the head leads positioned over the corresponding portion of printed circuitry adapted to receive the head leads.
Figure 11:
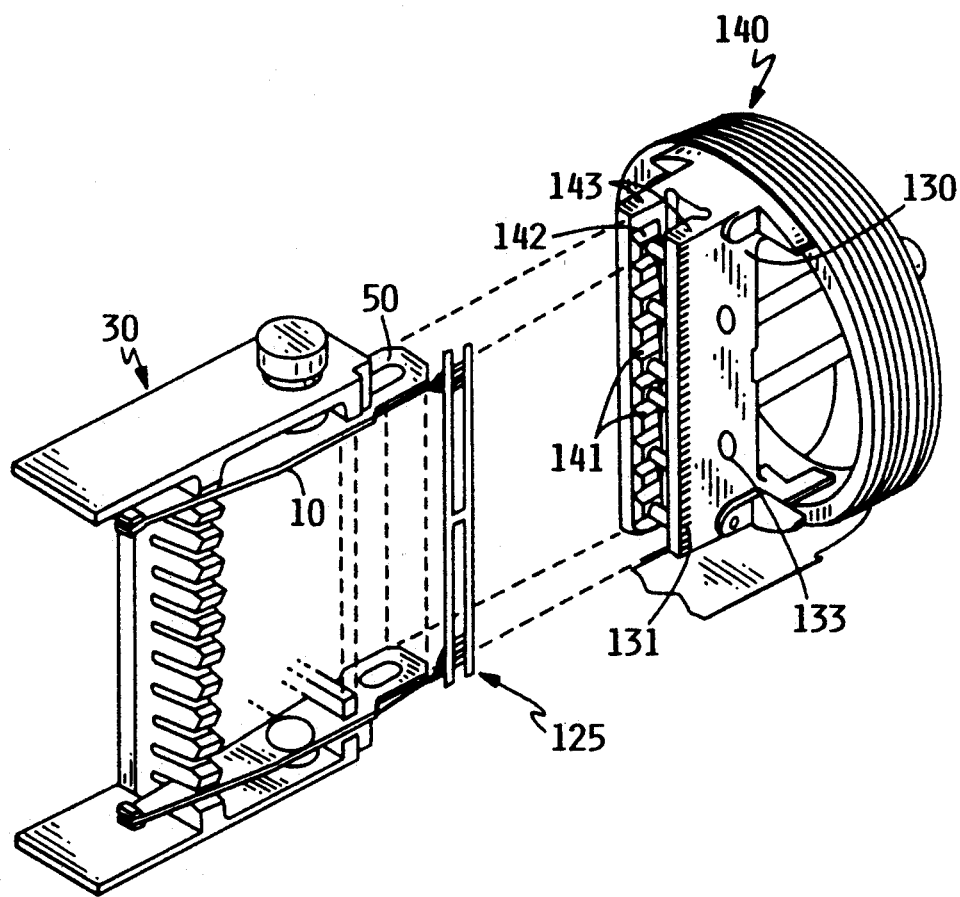
FIG. 11 is a schematic perspective view of the head carrier and associated lead locating frame, a portion of the disk actuator mechanism adapted to receive the magnetic head arm assemblies, and a portion of the printed circuitry adapted to receive the head leads.

FIGS. 9, 10, and 11 show stages in the connection of the head leads, located by the frame, to corresponding flexible circuitry mounted on the moving actuator.

FIG. 9 shows a portion of a head carrier 30 and associated magnetic head arm assemblies 10, the head leads being located using a lead locating frame 125 constructed from two laminae 70 as described above. The figure also shows a corresponding portion of the flexible circuitry 130, to which the leads are to be connected. The circuitry includes solder pads 131, disposed on the circuitry with spacing corresponding to that of the connection portions of the leads held in the frame 125. The circuitry also includes lead frame alignment holes 132, disposed to match the alignment holes 77, 78 and 79 in the frame laminae. The frame 125 may be aligned onto the circuitry by means of rods (not shown) which are passed through corresponding alignment holes in the frame and on the circuitry.

Typically, the flexible circuitry carries electronic components 133 associated with the data channel.

In FIG. 10 the locating frame has been aligned onto the flexible circuitry, ready for soldering. The connection portions of the head leads 15 lie across corresponding solder pads 131 on the circuitry. A large number of head leads may then be soldered in one operation using wave or probe soldering.

FIG. 11 provides a schematic perspective view of the head carrier 30 and frame 125, and a portion of a linear actuator mechanism 140. For clarity, all but two of the magnetic head arm assemblies 10 have been omitted from the drawing. Similarly, certain mechanical parts of the actuator, such as bearings, have not been drawn.

With reference to FIG. 11, the head carrier 30 loaded with head arm assemblies is presented to the actuator mechanism so that the tail portion 50 of each rigid arm 20 locates in a corresponding slot 141, which comprises two grooves 142 in the facing side members 143 of the actuator mechanism, and so that the lead locating frame 125 lies roughly in position over the solder pads 131 on the flexible circuitry 130. When in place, the head arm assemblies 10 are secured in position by means of clamping bolts (not shown) which pass through both side members 143. The lead locating frame 125 is then precisely aligned with the conductors on the flexible circuitry, using the method described above, and the leads are soldered. Because the locating frame makes negligible difference to the mass of the moving portion of the actuator, it may be left permanently in place on the actuator.

We claim:
1. A head/support assembly for use in a disk drive having a disk, said head/support assembly comprising:
   at least one head element for reading information from and/or writing information on a record disk of a disk drive,
   a support structure mountable in such a disk drive for supporting the head element in transducing relationship with said disk, and
   a plurality of electrical conductor leads for carrying information signals to or from the head element,
   the assembly further including a head lead locating means for locating the head leads remotely from the head element and retaining then in fixed spaced apart relationship over a sufficient portion of their lengths to permit direct electrical connection of said portions to a correspondingly spaced pattern of conductors on external circuitry,
   characterized in that the locating means comprises a member to which the leads are attached, the leads providing the only mechanical connection between said member and the support structure.

2. A head/support assembly as claimed in claim 1, wherein said member includes a first lamina having a surface to which the leads are attached.

3. A head/support assembly as claimed in claim 2, wherein said head lead locating means further includes a second lamina, the leads being sandwiched between said laminae.

4. A head/support assembly as claimed in claim 2, further characterized in that the head lead locating means includes a frame across which the connection portions of the leads extend.

5. A head/support assembly as claimed in claim 4, in which the frame includes two or more spaced apart strips of material, defining a gap across which the connection portions of the leads extend.

6. A head/support assembly as claimed in claim 2, in which the head lead locating means is substantially resistant to the heat associated with the subsequent soldering of the head leads to such external circuitry.

7. A head/support assembly as claimed in claim 6, wherein said first mentioned lamina is made from a polyimide.

8. The head/support assembly as claimed in claim 1 further characterized in that the head leads from said head/support assembly is located by a common locating means.

9. A head/support assembly as claimed in claim 2, in which at least a portion of the surface to which the leads are attached of said first lamina has a coating of an adhesive material.

10. A data access mechanism comprising:
a housing;
a spindle attached to said housing;
a motor for rotating said spindle;
at least one disk attached to said spindle;
an actuator attached to said housing;
an actuator motor for moving said actuator, said actuator further comprising:
a head/support structure;
a transducer attached to said head/support structure, said head/support structure holding said head in transducing relation with said disk; and
a plurality of electrical lead wires for carrying signals to and from said head;
means for locating electrical lead wires in fixed spaced apart relation over a portion of the length of the lead wires so that direct electrical connection can be made to a correspondingly spaced pattern of pads, wherein said locating means comprises a member to which said lead wires are attached, the leads providing the only mechanical support connecting said member to said head/support structure.

11. The data access mechanism of claim 10 further comprising:
a moveable carriage on which said head/support assembly is mounted for movement relative to the disk,
a circuit support member also mounted on the carriage, which supports data channel components and a conductor pattern on which said components are mounted and to which they are connected,
means for locating electrical lead wires being registered with a corresponding portion of the circuit support member and the connection portions of the head leads being electrically connected to corresponding portions of the conductor pattern.

12. A method for manufacturing a head/support assembly for a disk drive, said head/support member having at least one transducing head attached thereto, the transducing head having a plurality of head lead wires attached to said transducing head element for attaching to a set of pads beyond the head/support structure, said method comprising:
placing a locating member on a jig, said jig being an apparatus used for manufacturing said disk drive, but which is not incorporated into said disk drive;
supporting, with said jig, a head/support structure and associated head element in juxtaposition with said locating member;
laying the head lead wires from the head elements across said locating ember in said desired spaced apart relationship, while said head/support structure and associated head element are supported in juxtaposition with said locating member by said jig; and
securing the head leads to said locating member.

13. The method, as claimed in claim 12, for manufacturing a head/support assembly wherein the locating member is a lamina and the head lead locating means includes a further lamina, the method further comprising the steps of:
placing said further lamina over said first mentioned lamina to sandwich said leads therebetween, and
bonding said two laminae to retain the leads in desired spaced apart relationship.

14. The method, as claimed in claim 13, wherein the jig includes alignment pegs and wherein the laminae have alignment holes wherein the step of placing the laminae on the jig includes the step of aligning the alignment holes in the laminae with the alignment pegs on the jig.

15. The method, as claimed in claim 14, in which said alignment holes are disposed asymmetrically on the laminae.

16. The method, as claimed in claim 12, in which the step of laying one or more head lead wires across said locating member further includes the step of aligning the head lead wires in a guide on the jig.

17. The method, as claimed in claim 16, in which the guide in the jig includes slots in which the head leads are located during said securing step.

18. The method, as claimed in claim 17, further including the step of temporarily restraining the free ends of the leads.

19. The method, as claimed in claim 18, in which the free ends of the leads are temporarily restrained by bonding them to an adhesive layer on the jig, spaced from the guide.

20. A head/support assembly for use in a disk drive having a disk, said head/support assembly comprising:
at least one head element for reading information from and/or writing information on a record disk of a disk drive;
a support structure mountable in such a disk drive for supporting the head element in transducing relationship with said disk;
a plurality of electrical conductor leads for carrying information signals to or from the head element; and
a first lamina and a second lamina for locating the head leads remotely from the head element and retaining them in fixed spaced apart relationship over a sufficient portion of their lengths to permit direct electrical connection of said portions to a correspondingly spaced pattern of conductors on external circuitry, said first and second laminae being attached to each other at opposed surfaces thereof, said leads being sandwiched between said opposed surfaces of said first and second laminae.

21. The head/support assembly as claimed in claim 20, in which said first lamina comprises two substantially parallel and spaced apart strips of material connected together and defining a gap across which the connection portions of the leads extend.

22. The head/support assembly as claimed in claim 20, in which at least a portion of one of said opposite surfaces has a coating of an adhesive material.

23. The head/support assembly as claimed in claim 20, in which the head lead locating means is substantially resistant to the heat associated with the subsequent soldering of the head leads to such external circuitry.

24. The head/support assembly as claimed in claim 23, wherein said first mentioned lamina is made from a polyimide.

* * * * *